REAGENT-IMPREGNATED SUBSTRATE FOR THE PERFORMANCE OF BACTERIAL AND CHEMICAL TESTS
Filed April 11, 1972
FIG. 1
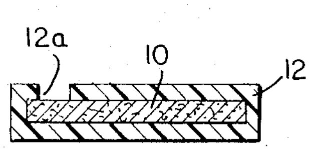
PRIOR ART
FIG. 2
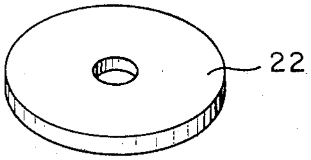
FIG. 3
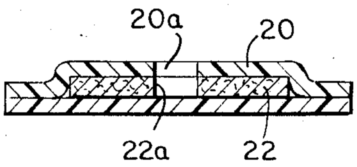
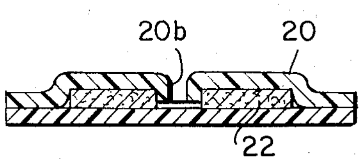
FIG. 4
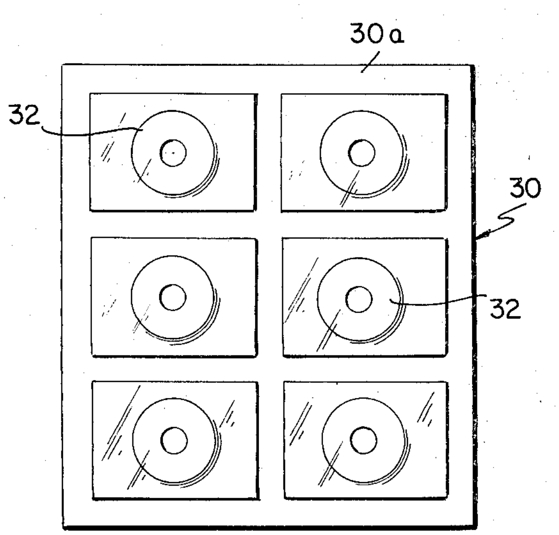
FIG. 5
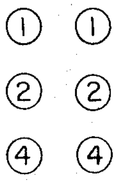
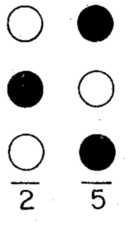
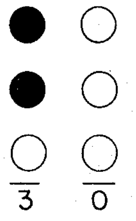
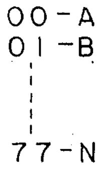
FIG. 6 FIG. 7 FIG. 8 FIG. 9

United States Patent Office 3,810,739
Patented May 14, 1974

3,810,739

REAGENT-IMPREGNATED SUBSTRATE FOR THE PERFORMANCE OF BACTERIAL AND CHEMICAL TESTS

William J. Nussbaum, 84—25 Smedley St., Jamaica, N.Y. 11435

Filed Apr. 11, 1972, Ser. No. 243,021
Int. Cl. C12k *1/10;* G01n *31/14, 33/16*
U.S. Cl. 23—253 TP 27 Claims

ABSTRACT OF THE DISCLOSURE

There is disclosed a reagent-impregnated substrate for the performance of bacterial and chemical tests. The substrate includes a hole into which the test sample, for example, a suspension of a test organism, is placed. The substrate is enclosed in a plastic pouch except for a small opening on top of the substrate hole through which the test sample is applied to the substrate. Evaporation of the sample is kept to a minimum because no part of the substrate is under the pouch opening. To simplify the identification of particular bacteria, a set of substrates, each for performing a different test, is packaged as a unit with the substrates being arranged in rows and columns. Preferably, each column has three substrates and a different one of the numbers 1, 2 and 4 is associated with each. The numbers associated with the positive test results in each column are added. The resulting number sequence (e.g., 724) uniquely identifies a particular bacterium or class of bacteria which can readily be determined from a chart furnished with the packaged set.

This invention relates to reagent-impregnated substrates used to identify test samples, and more particularly to constructions and arrangements which provide more reliable test results and interpretations thereof.

In recent years, great advances have been made in techniques for identifying bacteria. Typical systems which are presently marketed consist of a card on which a series of reagent-impregnated substrates are disposed. The reagent used in each substrate changes color when one or more particular bacterial colonies are applied to it. If a portion of the suspension of the same test organism is placed on each substrate, the organism, or a group of which it is a member, can often be identified by noting which of the test results are positive. (A test result is positive if the original color of the substrate changes to a respective new color.)

It is not enough in every case, however, simply to place a test sample on a substrate and then look for a color change. It is often necessary to incubate the substrate (or a card of substrates) by placing it in a controlled oven for several hours. Unfortunately, it is possible for the test sample to evaporate in the oven before any color change takes place in the substrate on which it was placed.

For this reason, the top of each substrate is often covered with a transparent plastic material which is unaffected by the heat of the oven and which permits a color change to be seen through it. At one end of the plastic covering a hole is provided so that the test sample in aqueous form can be applied to the substrate. The aqueous sample diffuses in the porous substrate so that a portion of it moves from that part of the substrate under the hole in the covering to parts of the substrate which are covered. There is little evaporation from covered parts of the substrate and consequently there may remain a sufficient amount of the test sample in the substrate for a positive reaction to take place.

While the test cards on the market greatly simplify test procedures, there are still numerous problems which remain to be solved. One of the most important of these is that in many cases enough of the test sample still evaporates to preclude a recognizable positive reaction; in such a case, the test results may be erroneous. The reason that much of the test sample evaporates is that, despite diffusion of the test sample within the substrate, the greatest concentration is in that portion of the substrate directly beneath the hole in the covering since that is where the test sample is applied. This portion of the substrate is not protected by the covering and considerable evaporation can thus take place. Furthermore, as the sample under the hole evaporates through it, that part of the sample around the hole diffuses into the now low-concentration part of the substrate under the hole and then it too evaporates. In effect, the hole acts as a "sink," constantly "drawing" the sample toward it and then allowing it to evaporate. And it is not possible to reduce the evaporation by using a hole of very small diameter because this would make it exceedingly difficult to apply the required quantity of the test sample to the substrate in the first place.

Another problem with prior art test systems is that it is often very time consuming to interpret the test results. A typical system may include ten substrates, each impregnated with a different reagent. Suppose that color changes occur in four of the substrates. It may be exceedingly difficult, especially in the case of infrequently encountered bacteria, to rapidly interpret the test results. Typically, a chart is provided which identifies those bacteria which cause a color change in each substrate. To identify a particular bacterium, it is necessary to inspect the chart and determine which is the bacterium which is common to each of the positive tests—a time consuming and tedious task.

It is a general object of my invention to provide an improved reagent-impregnated test substrate and a plastic covering therefor which minimizes evaporation during incubation.

It is another object of my invention to provide an arrangement of substances in a unitary package, together with a simple chart coding scheme, for allowing almost immediate and correct interpretation of the test results.

Before proceeding with a description of the invention, it will be helpful to place the present invention in proper perspective. My invention does not pertain to particular tests, the reagents used in the substrates, or the preparation of the test samples. Instead, the invention pertains to the shape of a substrate, the manner in which it may be enclosed, and the arrangement of a group of substrates in a set and the use of a coding chart furnished with it. The prior art is replete with particular test examples and reference may be made, for example, to Buissiere et al. Pat. No. 3,367,841 entitled "Device and Process for the Study of the Enzymatic Characteristics of Living Cells." Although that particular patent is directed to tests on living cells, it is to be understood that the principles of my invention are applicable to all kinds of biological, chemical and the like tests. The invention finds use wherever a test sample is applied to a reagent-impregnated substrate. As used herein, a "reagent-impregnated substrate" is a substrate which includes a chemical or some other reagent which reacts with one or more particular test samples to be identified, and a "positive test result" is a change in some characteristic (usually, although not always, the color) of the substrate when the particular test samples are applied to it. It should also be noted that to perform a typical test, as in the prior art, it is necessary to reconstitute the dry reagent initially in the substrate by adding a solven (e.g., water) to it. In some cases, this is accomplished by applying the solvent directly to the substrate (e.g., through a hole in a plastic covering), followed by the application of a wet or dry test sample to the substrate. Alternatively, the test sample may be a moist paste or it may be dispersed in a solvent, in which case all that is required is to apply it to the substrate.

Briefly, in accordance with the principles of my invention and in the preferred embodiment thereof, each substrate, which preferably but not necessarily has a circular shape, has a hole in it (preferably, in a central region thereof). This single difference offers four advantages, without even considering the very great benefit of the configuration when it is enclosed in a pouch or some other covering.

First, as compared with a substrate of the same shape but without a hole, the substrate with a hole holds more liquid test sample but affords less opportunity for the sample to evaporate. This is because an additional amount of the liquid may be held in the hole; also, the capillary forces tend to slow down evaporation of the liquid in the hole.

Test substrates are often marketed by placing a stack of similarly impregnated units in a vial or some other container. To perform a test, a substrate may be picked up with tweezers and placed on a Petri dish on which there is a bacterial colony. The substrate is then moistened, the dish is covered, and a reaction, if any, is observed. With a conventional substrate it is not standard practice to place it directly over the bacterial colony. If this is done, since the colony area is almost always less than the substrate area, one must wait for upward diffusion of the bacteria through the substrate until a reaction can be observed on the upward face of the substrate. The common practice is to place an edge of the substrate in contact with the colony. This allows observation of a color change as soon as a reaction takes place. However, the reaction can only be seen in the vicinity of that small part of the substrate (near an edge) which is in contact with the colony. By providing a hole in the substrate, it can be placed such that the hole surrounds the colony and a reaction can be observed all around the wall of the hole; there is a much larger surface area on which a rapid color change takes place.

The third advantage of the hole is that it serves as a "container" for a sample to be tested. For example, if a crystal is to be tested, it simply can be placed in the hole; in addition to all of the other advantages of the hole, it "holds" the crystal in contact with the substrate and makes the test more immune, for example, to vibrational effects.

The fourth advantage of providing a hole in the substrate is that it is easier to lift the substrate with tweezers if there is a hole in it.

In those cases in which a plastic covering is provided, there is another very great advantage. The substrate is completely shielded by a plastic covering, except on top of the hole. To perform a test, a test sample is placed through the covering hole into the substrate. Initially, the test sample is on top of the bottom surface which supports the substrate and is surrounded by the wall of the substrate hole. The sample then diffuses radially outwardly from the center of the hole into the substrate.

It is because of the hole that the evaporation problem is almost completely solved. There is very little evaporation during the course of the many hours that the test reaction takes place, even when the substrate is placed in an oven, because there is no substrate (and, therefore, test sample) directly below the hole in the covering. In the prior art, that part of the substrate beneath the hole in the covering was directly exposed to the atmosphere and acted as a "sink" for the sample. In the invention, the only part of the substrate which is exposed to the atmosphere is the wall of the hole. Since the area of the hole wall is much less than the cross-sectional area of the hole itself, it is apparent that there is much less evaporation when using the test device of my invention.

Another advantage of the substrate hole is that when an anaerobic reaction is to take place, there is much less likelihood of oxygen in the atmosphere reacting with the test sample. This is because, unlike the prior art, there is no substantial portion of the substrate which is exposed to the atmosphere. The only part of the substrate which is exposed is the wall of the hole; the surface area of the hole in the often paper-thin substrate is minimal.

As described above, prior art systems have generally included a line of substrate, perhaps ten in number on a single card. In accordance with the principles of my invention, however, the substrates are arranged in rows and columns. Preferably, there are three substrates in each column. (The minimum dimensions of the array in accordance with the principles of the invention are 2 x 2.) In the illustrative embodiment of the invention, the numbers 1, 2 and 4 are associated with the three substrates in each column (from top to bottom). After the tests are performed, the numbers associated with the tests whose results are positive in each column are added. For example, if the two top tests are positive in a particular column, the number three is the resulting column sum. If the first and last tests are positive, the resulting sum if five. In general, depending upon whether no tests, or one, two or three tests in a column are positive, the sum number for a column is 0–7; there are eight possibilities in all. In the case of a nine-test system, the three sum digits (one for each column) are used to form a 3-digit number in the range 000–777. (These numbers are "octal" numbers, and there are 512 possibilities in all.) A chart is provided on which each of the 512 final numbers is listed together with the chemical or bacterium which, if tested, is known to produce that 3-digit number. (If certain 3-digit numbers are not "real" possibilities, that is, there are no test samples which cause only the respective test to have positive results, these 3-digit numbers can be omitted from the list.) The look-up procedure takes no more than a few seconds; in fact, even if there are up to a half-dozen columns, the multi-digit sum number can be determined and looked up on the chart in no more than a few seconds.

Although the numbers 1, 2 and 4 have been discussed, it will be apparent that other numbering schemes are possible. For example, the numbers 1, 2 and 5 can be used. The choice of numbers is dictated by the following consideration: a number set must be chosen such that every possible column sum uniquely identifies a respective set of positive test results. For example, the number set 1, 2 and 3 is not suitable because if only the first and second sets are positive, the column sum is three. Similarly, if only the third test is positive the column sum is three. A A column sum of three would thus not uniquely identify a set of positive test results.

It should also be noted that in the preferred embodiment of the invention, three substrates are included in each column. If only two substrates are in each column, rather than three (in two systems which perform the same number of tests), the former will result in final numbers with more digits than the latter and it is more cumbersome to work with such longer numbers. As for having more than three substrates in each column, the codes which would have to be used could add up to ten or more, and for the sake of simplicity it is desirable to have only a single sum digit associated with each column. The number sets of three each which produce under-10 sum digits are 1, 2, 4; 1, 2, 5; 1, 2, 6; 1, 3, 5; and 2, 3, 4.

It is a feature of my invention to provide a reagent-impregnated substrate having a hole therein.

It is another feature of my invention to provide a reagent-impregnated substrate completely shielded by a covering except for a hole in a transparent surface thereof which is superpositioned on top of the hole in the substrate.

It is another feature of my invention to provide a test system in which a plurality of test units are arranged in rows and columns in an array having minimum dimensions of 2 x 2, to be used together with an appropriately coded chart for the rapid interpretation of the test results.

Further objects, features and advantages of the invention will become apparent upon consideration of the following detailed description in conjunction with the drawing in which:

FIG. 1 is a cross-sectional view through a typical prior art test unit;

FIG. 2 depicts an illustrative embodiment of the reagent-impregnated substrate of my invention;

FIG. 3 is a cross-sectional view through an illustrative embodiment of my invention in which the substrate is enclosed by a plastic pouch;

FIG. 4 is a cross-sectional view through another illustrative embodiment of my invention in which the substrate is enclosed by a plastic pouch;

FIG. 5 is a planar view of a test system constructed in accordance with the principles of my invention; and FIGS. 6–9 will be helpful in understanding how the test results using the system of FIG. 5 can be interpreted rapidly, FIG. 6 depicting illustrative numbers associated with each substrate in the system, FIGS. 7 and 8 depicting two possible test result patterns using the system of FIG. 5, and FIG. 9 depicting the form of a chart which can be furnished as part of the system of FIG. 5 to facilitate the interpretation of the test results.

FIG. 1 depicts a prior art test unit arrangement. Typically, the substrate 10 is longer than it is wide; in any event, it is a continuous sheet of material and does not have a hole. If a covering is provided, as shown, hole 12*a* in covering 12 is typically near an end of the substrate. The covering is made of clear plastic such as polyethylene at least on that side of the substrate which is viewed to verify a color change. The purpose of the covering is to enclose the substrate and make it air-tight and water-tight; the only access to the substrate is through the hole 12*a* in the covering. The substrate can be made of various materials, such as blotting paper, in which a reagent suitable for a particular test is impregnated. The reagent can be impregnated in the substrate by means of a solvent which is then dried. The reagent is reconstituted by placing a fed drops of solvent in hole 12*a*, the solvent then diffusing through the substrate, followed by inserting the test sample through hole 12*a*. Alternatively, the test sample may consist of a paste or may be an aqueous solution, in which case the reagent is reconstituted when the sample is applied to the substrate.

FIG. 2 depicts the basic substrate 22 of my invention. Although a circular shape is shown, any shape can be used—provided that it has a hole.

FIG. 3 depicts a cross-sectional view of a substrate-covering unit constructed in accordance with the principles of the invention. A reagent-impregnated disc 22 is provided, around which there is a polyethylene pouch 20 having a hole 20*a* at the center thereof. The pouch may be made by taking two circular or square sheets of plastic materal and heat-sealing the edges together while the disc is between them. The surface contact of the sheets with the disc is sufficient to hold the disc in place. If necessary, adhesive may be used on the bottom surface of the disc to secure it to the bottom plastic sheet; also, the heat-sealing process often melts the bottom sheet just enough for it to stick permanently to the disc. Proper positioning of the disc, so that the disc and pouch holes are contiguous, is assured of course if the plastic sheets have the same shape as the disc (with additional heat-seal edges).

The embodiment of FIG. 4 is similar to that of FIG. 3 except that the top plastic sheet includes a lip 20*b* which projects into the substrate hole, although not all the way down to the bottom plastic sheet. The lip serves to reduce still further the area of the substrate which is exposed to the atmosphere, and it also functions to maintain the covering and substrate holes aligned with each other.

It is the substrate hole which greatly reduces the evaporation of the test sample during incubation. The only part of the substrate which is exposed to the atmosphere is the inner wall of the hole 22*a* in FIG. 3, and only the very bottom of it in FIG. 4. The area of the inner hole is much less than the cross-sectional area of the hole, and consequently there is much less exposure of the test sample to the atmosphere. The various substrate-pouch units which are shown in the drawings are not drawn to scale and thus the area relationships are not apparent. However, in actual practice, a typical disc (FIG. 2) has an outer diameter of 0.5 inch, an inner diameter of $\frac{3}{16}$ inch, and a height of 2 millimeters. For such a disc, the pouch (FIGS. 3 and 4) may be made of 4-mil thick polyethylene squares which are heat-sealed at their congruent edges. It should be noted that in the illustrations of FIGS. 3 and 4 air-pockets are formed around the discs. This is of no importance as long as the discs are properly held in place within the pouches. It should also be noted that the substrate "hole" may be at an edge; in this case also, there will be little evaporation during incubation.

FIG. 5 depicts a test sample which consists of six differently impregnated discs. Each disc has a center hole and there is a hole in each of the six pouches which is congruent with the hole in the contained disc. The system may be fabricated by taking one sheet of plastic material 30 (in which there are no holes), placing the six previously impregnated discs on top of the sheet, placing a second sheet (with pre-cut holes) on top of the first sheet and the discs, and heat-sealing the two sheets within the regions shown by the vertical and horizontal criss-cross pattern 30*a* in FIG. 5. Although the system of FIG. 5 includes only two columns of discs, it may often be advantageous to have three or more columns, depending on the number of tests to be performed.

Each disc in a column has one of the numbers 1, 2 and 4 associated with it as symbolized in FIG. 6. FIG. 7 refers to the system of FIG. 5 and the darkened circles represent the tests which have produced positive results. The respective numbers associated with the positive tests in each column are added together; the sum for the left column is 2 and the sum for the right column is 5. Consequently, the two-digit number 25 is the overall test result for the system. In the example of FIG. 8 the result for each test in the right column is negative and the test result is positive for each of the two top tests in the left column. Consequently, the two-digit sum number representing the overall test result is 30.

For the system of FIG. 5 and with the number assignments depicted in FIG. 6, the final two-digit test result numbers vary between 00 and 77 (in "octal" code), there being 64 combinations in all. A chart as shown in FIG. 9 is provided with the system. Each of the numbers 00–77 is listed in the chart, and a particular bacterium or chemical substance is associated with each number. Since each overall combination of test results is uniquely identified by a respective number, a test substance (or a group of substances if all of them produce the same overall test result pattern) can be determined simply by looking up the appropriate entry in the chart. For example, for the case illustrations in FIGS. 7 and 8, entries adjacent to the numbers 25 and 30 would be read from the chart. It is apparent that in a twelve-test system (having four columns), the four-digit sum number can be determined in a few seconds, followed by immediate identification of the test sample by reference to the chart.

A practical example illustrating the advantages of arranging the tests in a matrix and furnishing a coded chart with the test group is the following. Suppose that a 9-test array is provided as follows:

| | Column 1 | | Column 2 | | Column 3 | |
|---|---|---|---|---|---|---|
| Row: | | | | | | |
| 1 | Citrate | 4 | $H_2S$ | 4 | Melibiose | 4 |
| 2 | ONPG | 2 | Urea | 2 | Inositol | 2 |
| 3 | Lysine | 1 | Ornithine | 1 | Rhamnose | 1 |

The array also shows the digits associated with the nine tests. (Although in the illustrative example of FIGS. 5–9, the order of digits was 1, 2, 4, other permutations, such as 4, 2, 1 in the present example, can be used.)

Consider further that for a particular sample the citrate, ONPG, $H_2S$, urea, ornithine, melibiose and rhamnose tests are positive, and the others are negative. As a present-day test set is furnished, the nine tests would be in one row and a chart such as the following would be furnished with the set:

| | Citrate | ONPG | Lysine | $H_2S$ | Urea | Orni-thine | Meli-biose | Ino-sitol | Rham-nose |
|---|---|---|---|---|---|---|---|---|---|
| *E. Coli* | – | + | V | – | – | V | + | – | V |
| Shigella | – | V | – | – | – | V | – | – | V |
| Edwardsiella | – | – | + | + | – | + | V | – | – |
| Salmonella | V | – | + | V | – | + | + | V | + |
| Arizona | + | + | + | + | – | + | + | – | + |
| Citrobacter | + | + | – | + | V | V | + | – | + |
| Klebsiella | + | + | + | – | + | – | + | + | + |
| *Ent. Cloacae* | + | + | – | – | V | + | + | V | + |
| *Ent. Aero* | + | + | + | – | + | + | + | + | + |
| Hafnia | V | + | + | – | – | + | – | – | + |
| *Ent. Liq* | + | + | V | – | V | + | + | + | – |
| Serratia | + | + | + | – | V | + | – | V | – |
| *Proteus vulgaris* | V | – | – | + | + | – | – | – | – |
| *Proteus mirabilis* | V | – | – | + | + | + | – | – | – |
| *Proteus morganii* | – | – | – | – | + | + | – | – | – |
| *Proteus rettgeri* | + | – | – | – | + | – | – | + | V |
| *Providence alk.* | + | – | – | – | – | – | – | – | – |
| *Providence stuarti* | + | – | – | – | – | – | – | + | – |

In the chart, a plus sign indicates a positive test result, a minus sign indicates a negative test result, and the symbol V indicates a variable or indeterminate condition. For example, if the bacterial test sample is Serratia, the citrate, ONPG, lysine and ornithine tests must be positive, the $H_2S$, melibiose and rhamnose tests must be negative, and each of the urea and inositol tests can be either positive or negative. In the selected sample described above, the 9-symbol sequence for the test results is

++–++++–+.

It takes different persons different time intervals to match up the 9-symbol string with one of the rows of the prior art chart (in which matching procedure a V in a row can be considered to be + or –). But rarely can the test sample be identified in a matter of seconds.

On the other hand, the following chart is furnished with the test array of my invention.

| | | | |
|---|---|---|---|
| 000 | Shigella. | 423 | *Proteus rettgeri.* |
| 001 | Shigella. | 430 | *Proteus mirabilis.* |
| 010 | Shigella. | 460 | *Proteus vulgaris.* |
| 111 | Shigella. | 470 | *Proteus mirabilis.* |
| 030 | *Proteus morganii.* | 515 | Salmonella. |
| 060 | *Proteus vulgaris.* | 555 | Salmonella. |
| 070 | *Proteus mirabilis.* | 557 | Salmonella. |
| 115 | Salmonella. | 615 | *Ent. cloacae.* |
| 150 | Edwardsiella. | 616 | *Ent. liq.* |
| 154 | Edwardsiella. | 617 | *Ent. cloacae.* |
| 155 | Salmonella. | 635 | *Ent. cloacae.* |
| 157 | Salmonella. | 636 | *Ent. liq.* |
| 200 | Shigella. | 637 | *Ent. cloacae.* |
| 201 | Shigella. | 645 | Citrobacter. |
| 204 | *E. coli.* | 655 | Citrobacter. |
| 205 | *E. coli.* | 665 | Citrobacter. |
| 210 | Shigella. | 675 | Citrobacter. |
| 211 | Shigella. | 707 | Klebsiella. |
| 214 | *E. coli.* | 710 | Serratia. |
| 215 | *E. coli.* | 711 | Hafnia. |
| 304 | *E. coli.* | 712 | Serratia. |
| 305 | *E. coli.* | 716 | *Ent. liq.* |
| 311 | Hafnia. | 717 | *Ent. aero.* |
| 314 | *E. coli.* | 727 | Klebsiella. |
| 315 | *E. coli.* | 730 | Serratia. |
| 400 | *Providence alk.* | 732 | Serratia. |
| 402 | *Providence stuarti.* | 736 | *Ent. liq.* |
| 422 | *Proteus rettgeri.* | 755 | Arizona. |

The chart is derived as follows. As a single example consider the test results for *E. Coli*. The prior art 9-symbol string for this bacterium is –+V––V+–V. Since there are three indeterminate individual test results, an *E. Coli* sample can result in eight different symbol strings which consist of plus and minus signs only. (In general, if there are N indeterminate (V) symbols in a symbol string for a particular test sample, then when the sample is tested any one of $2^N$ symbol strings, of plus and minus signs only, may result.) The following chart illustrates the weight of each test in a column, with the required negative results for the *E. Coli* test being crossed off, and with parenthesis being placed around the weights of the indeterminate tests:

| | | | | | |
|---|---|---|---|---|---|
| Citrate | 4 | $H_2S$ | 4 | Melibiose | 4 |
| ONPG | 2 | Urea | 2 | Inositol | 2 |
| Lysine | (1) | Ornithine | (1) | Rhamnose | (1) |

It is apparent that for the *E. Coli* test the first column sum can be 2 or 3, the second column sum can be 0 or 1, and the third column sum can be 4 or 5. Consequently, the *E. Coli* test may result in any one of eight different 3-digit column sum numbers, namely, 204, 205, 214, 215, 304, 305, 314 and 315. Referring to the chart of my invention depicted above, it will be observed that the *E. Coli* bacterium is identified for each of these eight final 3-digit sum numbers.

Returning to the illustrative example, in which seven of the test results are positive and only the lysine and inositol tests are negative, the final column sum numbers are rapidly determined as follows:

| | | | | | |
|---|---|---|---|---|---|
| Citrate | 4 | $H_2S$ | 4 | Melibiose | 4 |
| ONPG | 2 | Urea | 2 | Inositol | 2 |
| Lysine | 1 | Ornithine | 1 | Rhamnose | 1 |
| | 6 | | 7 | | 5 |

The final 3-digit number is 675, and reference to the chart furnished with my test matrix shows that the bacterium identified by this 3-digit number is Citrobacter. It is apparent that no more than a few seconds are required to compute the column sums for the test results of any test sample, followed by almost immediate identification of the test sample with reference to the chart furnished with the test matrix.

Although the invention has been described with reference to particular embodiments, it is to be understood that these embodiments are merely illustrative of the application of the principles of the invention. For example, the substrate of my invention can be completely enclosed in a plastic pouch with no hole being provided in the covering. This avoids any possibility of contamination, and to perform a test all that is required is to puncture the uppermost plastic sheet directly above the hole in the substrate prior to insertion of the test sample. In the case of a 7-test test package, since a minimum of two and a maximum of three tests are preferred for each column, two columns may contain three tests each and the third would contain only one. In such a case, the third digit of the final 3-digit test result number would be either one of only two values. (It is also possible in such a case to include only two-digit numbers in the chart but to prepare the chart in two groupings, with the result of the seventh test determining which grouping is consulted.) Also, it is apparent that my unique arrangement of tests and the associated chart furnished with them is not limited to substrates with holes or any other type of test medium. Tests of any type can be arranged as described above and furnished with an appropriate chart to facilitate immediate identification of a test sample. Also, instead of arranging the individual test units in a matrix array, they can be arranged linearly but subdivided into groups. For example, a 9-test row might have test unit weights of 1, 2, 4, 1, 2, 4, 1, 2, 4 with each 1, 2, 4 sequence corresponding to one digit of the final sum member. Thus it is to be understood that numerous modifications may be made in the illustrative embodiments of the invention and other arrangements may be devised without departing from the spirit and scope of the invention.

What I claim is:

1. A device for testing a biological, chamical or the like test sample comprising a substrate and a reagent impregnated therein, substrate having a hole extending therethrough for placement therein of the test sample to contact the wall of the substrate completely around said hole, and a covering around said substrate, said covering having a hole therein on one side of said substrate disposed above the hole in said substrate.

2. A device in accordance with claim 1 wherein said substrate is in the shape of a disc and said hole extends through the center thereof.

3. A device in accordance with claim 2 wherein said reagent changes color for a positive test result, said covering being transparent in the vicinity of said substrate hole.

4. A device in accordance with claim 1 wherein said covering consists of two sheets of clear plastic material disposed on opposite sides of said substrate with a heat-seal being formed along the congruent edges thereof.

5. A device in accordance with claim 1 wherein said covering includes a lip which extends partially into the hole in said substrate.

6. A device for testing a biological, chemical or the like test sample comprising a substrate having a reagent impregnated therein and a covering enclosing said substrate, said substrate and said covering having superpositioned holes extending therethrough for placement therein of the test sample to contact the wall of the substrate completely around said hole.

7. A device in accordance with claim 6 wherein said substrate is in the shape of a disc having a central hole therein.

8. A device in accordance with claim 6 further including means for securing said substrate to said covering.

9. A device in accordance with claim 6 wherein said reagent changes color for a positive test result and said covering is transparent in the vicinity of said holes.

10. A device in accordance with claim 9 wherein said covering consists of two sheets of clear plastic material disposed on opposite sides of said substrate with a heat-seal being formed along the congruent edges thereof.

11. A biological, chemical or the like test device for testing a single test sample comprising a plurality of test units each having a reagent-impregnated substrate with a covering therearound, each of said coverings including a hole for application therethrough of a test sample to the respective substrate, said test units being secured together in an array of rows and columns having minimum dimensions of 2 x 2, each of said substrates having a hole extending therethrough for placement therein of a portion of the test sample to contact the wall of the substrate completely around said hole with the hole in each of said coverings being disposed on top of the hole in the respective substrate.

12. A device in accordance with claim 11 wherein the reagent impregnated in each of said substrates changes color for a positive test result and each of said coverings is transparent in the vicinity of its hole.

13. A device in accordance with claim 12 wherein said coverings consist of two sheets of clear plastic material disposed on opposite sides of said substrates with heat-seals being formed along the congruent edges thereof and along lines separating and isolating all of said substrates from each other.

14. A device in accordance with claim 11 wherein said coverings consist of two sheets of clear plastic material disposed on opposite sides of said substrates with heat-seals being formed along the congruent edges thereof and along lines separating and isolating all of said substrates from each other.

15. A test system comprising a plurality of biological, chemical or the like test units and a coded chart for use therewith, each of said units including a reagent-impregnated substrate for application thereto of a test sample, said test units being secured together in an array of rows and columns having minimum dimensions of 2 x 2, said coded chart including a plurality of multi-digit numbers each identifying a respective test sample, each test unit in a column of said array having a respective digit associated therewith with the digits being such that the sum of any combination of selected digits for a column is different from the sums of all other combinations of selected digits for the same column, each digit of each coded number on said chart being equal to the sum of only the digits associated with the test units in a respective column in which predetermined reactions take place when the test sample identified by the coded chart number is applied thereto.

16. A test system in accordance with claim 15 wherein said test units are arranged in an array having three rows.

17. A test system in accordance with claim 16 wherein the digits associated with the test units in each column are selected from the sets 1, 2, 4; 1, 2, 5; 1, 2, 6; 1, 3, 5; and 2, 3, 4.

18. A test system in accordance with claim 16 wherein each of said test unit substrates has a hole extending therethrough and each test unit includes a covering around the respective substrate, the covering having a hole superposed on the hole in the substrate for placement therein of a test sample to contact the wall of the substrate completely around said hole.

19. A test system in accordance with claim 15 wherein each of said test unit substrates has a hole extending therethrough and each test unit includes a covering around the respective substrate, the covering having a hole superposed on the hole in the substrate for placement therein of a test sample to contact the wall of the substrate completely around said hole.

20. A test system comprising a plurality of biological, chemical or the like test devices and a coded chart for use therewith, each of said test devices being operative to perform a respective test on a test sample, said test devices being arranged in an array of rows and columns having minimum dimensions of 2 x 2, said coded chart including a plurality of multi-digit numbers each identifying a respective test sample, each test device in a column of said array having a respective digit associated therewith with the digits being such that the sum of any combination of selected digits for a column is different from the sums of all other combinations of selected digits for the same column, each digit of each coded number on said chart being equal to the sum of only the digits associated with the test devices in a respective column which produce predetermined test results when the test sample identified by the coded chart number is tested thereby.

21. A test system in accordance with claim 20 wherein said test devices are arranged in an array having three rows.

22. A test system in accordance with claim 21 wherein the digits associated with the test units in each column are selected from the sets 1, 2, 4; 1, 2, 5; 1, 2, 6; 1, 3, 5; and 2, 3, 4.

23. A test system in accordance with claim 20 wherein the digits associated with the test units in each column are selected from the sets 1, 2, 4; 1, 2, 5; 1, 2, 6; 1, 3, 5; and 2, 3, 4.

24. A test system comprising a plurality of biological, chemical or the like test devices and a coded chart for use therewith, each of said devices being operative to perform a respective test on a test sample, said test devices being assigned to groups, said coded chart including a plurality of multi-digit numbers each identifying a respective test sample, each test device in each group having a respective digit associated therewith with the digits being such that the sum of any combination of selected digits for each group is different from the sums of all other combinations of selected digits for the same group, each digit of each coded number on said chart being equal to the sum of only the digits associated with the test devices in a respective group which produce predetermined test results when the test sample identified by the coded chart number is tested thereby.

25. A test system in accordance with claim 24 wherein said test devices are arranged in groups of three each.

26. A test system in accordance with claim 25 wherein the digits associated with the test units in each group are selected from the sets 1, 2, 4; 1, 2, 5; 1, 2, 6; 1, 3, 5; and 2, 3, 4.

27. A test system in accordance with claim 24 wherein the digits associated with the test units in each group are selected from the sets 1, 2, 4; 1, 2, 5; 1, 2, 6; 1, 3, 5; and 2, 3, 4.

References Cited

UNITED STATES PATENTS

| | | | |
|---|---|---|---|
| 3,690,836 | 9/1972 | Buissiere et al. | 23—253 TP |
| 3,568,627 | 3/1971 | Selinger et al. | 23—253 TP X |
| 3,502,437 | 3/1970 | Mass | 23—253 TP |

OTHER REFERENCES

F. R. Neufeld, Aperture Card for Blood Typing, IBM Technical Disclosure Bulletin, vol. 11, No. 2 pp. 124–125 (July 1968).

JOSEPH SCOVRONEK, Primary Examiner

U.S. Cl. X.R.

195—103.5 R, 127; 235—61.12 R, 151.35